(12) United States Patent
Johnson (10) Patent No.: US 11,072,899 B1
(45) Date of Patent: Jul. 27, 2021

(54) TREE AND DEBRIS PUSHER, METHOD OF USE AND METHOD OF MANUFACTURE

(71) Applicant: Norman Johnson, Medicine Lodge, KS (US)

(72) Inventor: Norman Johnson, Medicine Lodge, KS (US)

( * ) Notice: Subject to any disclaimer, the term of this patent is extended or adjusted under 35 U.S.C. 154(b) by 0 days.

(21) Appl. No.: 16/856,656

(22) Filed: Apr. 23, 2020

(51) Int. Cl.
| | |
|---|---|
| *E01H 15/00* | (2006.01) |
| *A01G 23/08* | (2006.01) |
| *A01G 23/06* | (2006.01) |
| *E02F 3/815* | (2006.01) |

(52) U.S. Cl.
CPC ............. *E01H 15/00* (2013.01); *A01G 23/06* (2013.01); *A01G 23/08* (2013.01); *E02F 3/8152* (2013.01)

(58) Field of Classification Search
CPC ........ A01G 23/06; A01G 23/08; E01H 15/00; E01H 5/067; E02F 3/8152; E02F 3/76; E02F 3/7609
USPC ..................................... 37/301, 302; 171/63
See application file for complete search history.

(56) References Cited

U.S. PATENT DOCUMENTS

| 969,469 | A | * | 9/1910 | Gose | ..................... | A01D 29/00 |
|---|---|---|---|---|---|---|
| | | | | | | 171/83 |
| 2,187,707 | A | * | 1/1940 | Kane | ..................... | E02F 3/8152 |
| | | | | | | 37/301 |
| 2,233,821 | A | | 3/1941 | Ramer et al. | | |
| 2,485,407 | A | * | 10/1949 | Peterson | ............... | E02F 3/7618 |
| | | | | | | 172/826 |
| 2,491,058 | A | | 12/1949 | Peacock et al. | | |
| 2,491,208 | A | | 12/1949 | Price et al. | | |
| 2,505,923 | A | | 5/1950 | Taylor et al. | | |
| 2,770,056 | A | * | 11/1956 | Hawkins | ............... | E02F 3/7604 |
| | | | | | | 37/301 |
| 3,004,570 | A | * | 10/1961 | Clayton | ............... | A01G 23/093 |
| | | | | | | 144/34.1 |
| 3,021,619 | A | | 2/1962 | McGee | | |
| 3,111,777 | A | | 11/1963 | Prater | | |
| 3,195,247 | A | * | 7/1965 | Grimes | ............... | A01D 76/006 |
| | | | | | | 37/301 |
| 3,424,211 | A | * | 1/1969 | Marine | ............... | A01G 23/093 |
| | | | | | | 144/34.1 |

(Continued)

*Primary Examiner* — Thomas B Will
*Assistant Examiner* — Joan D Misa
(74) *Attorney, Agent, or Firm* — Margaret Millikin (57) ABSTRACT

A tree and debris pusher for removing and gathering felled trees, such as stands of dead cedar trees, particularly though not exclusively adapted for use on burned land from which dead trees must be cleared. The tree and debris pusher comprises a frame, a pusher bar assembly, a tooth assembly, and plurality of support and connecting structures. The pusher bar assembly forms a generally concave or arcuate shape, including a center section and transverse wings. The tooth assembly extends is contiguous with the pusher bar assembly and comprises a plurality of teeth extruding from therefrom so as to precede the pusher bar assembly in the direction of use of the tree and debris pusher and make first contact with trees and debris which are the object of removal. Support members and connecting members provide additional support and resist loads during operation of the tree and debris pusher. The tree and debris pusher clears trees and debris and piles the dead and debris in a desired location without changing attachments or machinery.

17 Claims, 7 Drawing Sheets

(56) References Cited

U.S. PATENT DOCUMENTS

| | | | | |
|---|---|---|---|---|
| 3,528,509 | A | * | 9/1970 | Den Bleyker ........ E02F 3/8155 |
| | | | | 172/815 |
| 3,557,850 | A | * | 1/1971 | Owens ................. A01G 23/093 |
| | | | | 144/34.6 |
| 4,067,369 | A | | 1/1978 | Harmon |
| 4,372,063 | A | * | 2/1983 | Work .................... A01G 23/093 |
| | | | | 37/301 |
| 4,390,071 | A | * | 6/1983 | Wright ................. E02F 3/8152 |
| | | | | 172/701.3 |
| 4,407,080 | A | * | 10/1983 | Mann .................... E02F 3/7609 |
| | | | | 37/405 |
| 5,127,172 | A | * | 7/1992 | Lund ....................... E02F 3/815 |
| | | | | 37/403 |
| 5,487,428 | A | * | 1/1996 | Yamamoto .............. E02F 3/845 |
| | | | | 172/4.5 |
| 6,763,618 | B1 | | 7/2004 | Moran |
| 6,766,618 | B2 | * | 7/2004 | Cardine ..................... B60J 1/17 |
| | | | | 49/352 |
| 7,243,690 | B1 | * | 7/2007 | Price ...................... A01G 23/08 |
| | | | | 144/34.1 |
| 7,415,999 | B1 | * | 8/2008 | Price ...................... A01G 23/08 |
| | | | | 144/34.1 |
| 8,783,376 | B2 | * | 7/2014 | Congdon .............. E02F 3/8152 |
| | | | | 172/701.3 |
| 8,905,447 | B2 | * | 12/2014 | James ...................... B65G 7/12 |
| | | | | 294/15 |
| 9,518,405 | B2 | | 12/2016 | Hull |
| 2017/0273238 | A1 | * | 9/2017 | Penner ................. A01D 34/015 |

\* cited by examiner

TREE AND DEBRIS PUSHER, METHOD OF USE AND METHOD OF MANUFACTURE

TECHNICAL FIELD OF THE INVENTION

The present invention relates generally to devices for felling and removing trees, and, more particularly, to devices for felling and removing burned trees, shrubs and debris from pasture, prairies, ranges, grasslands, croplands and forested land that have been damaged or destroyed by fire, that have been range burned or that have been damaged or destroyed by storms, tornadoes and other acts of God.

SUMMARY OF THE INVENTION

The present invention is directed to a pusher comprising a frame, a pusher bar assembly in communication with the frame, the pusher bar assembly comprising a central section having a length and first and second ends, and a first wing proximal the first end of the central section and a second wing proximal the second end of the central section, wherein the first wing has a length and the second wing has a length and the length of the central section with respect to the lengths of the first wing and the second wing ranges from a ratio of about 10:1 to about 10:3; and wherein the first wing and the second wing are attached to the central section at angles ranging from about 91 degrees to about 179 degrees and imparting a generally concave or arcuate shape to the pusher bar assembly and wherein the pusher bar assembly angles upward from a substrate at an angle q that ranges from 1 degree to about 20 degrees with respect to the substrate; and a tooth assembly contiguous with the pusher bar assembly and comprising a plurality of teeth extruding from therefrom so as to precede the pusher bar assembly in the direction of use of the tree and debris pusher and make first contact with trees and debris which are the object of removal.

The present invention further is directed to a method of removing or felling a tree, the method comprising the steps of providing a pushing surface for pushing the tree, wherein the pushing surface forms a central section having a length and first and second ends and forms a first wing proximal the first end of the central section and a second wing proximal the second end of the central section, and wherein the first wing has a length and the second wing has a length and the length of the central section with respect to the lengths of the first wing and the second wing ranges from a ratio of about 10:1 to about 10:3. The method also comprises the step of pushing the tree with the pushing surface.

The present invention further is directed to a method of making a tree and debris pusher, the method comprising the step of manufacturing the tree and debris pusher from industrial piping and sheet metal via welding or cutting.

DETAILED DESCRIPTION OF THE INVENTION

Forest and grass fires leave in their wake significant problems in the form of dead or damaged trees, shrubs and debris. Burned trees, or their dead branches, may fall at any point, presenting hazards to persons, livestock and property. Assessing the time at which a tree or dead branch may fall or collapse is difficult. A fire may smolder inside a large tree after a wildfire, burning on rotting or dead material for days. This imminent danger becomes apparent only when the tree falls weeks later, presenting the threat of harm to people, animals and property.

Although wildfires present dangers, fires are essential to the health of pastures, prairies, ranges, grasslands, croplands and forests. Prescribed fired have long been used by property owners and land managers to prevent unwanted stands of brush and trees, particularly cedar trees. When used properly, fire can be a valuable and productive tool in land management and use. However, when fires are set incorrectly or without proper planning, escaped fires in Kansas, Okla. and other agricultural regions, cause property damage to neighbors and expense to financially strapped fire departments. Uncontrolled fires also may present air quality issues.

Many farmers and ranchers conduct prescribed burns throughout the year to increase productivity and performance of their lands. Prescribed fires require planning for proper burning. As discussed herein, proper selection of essential equipment is imperative for a safe burn and for clearance post-burn. Once the plan is developed, the site prepared, the equipment selective and needed help available, the final step is to actually select a time to burn. Many of the escaped burns on private land in Kansas and other agricultural states occur when the weather changes during the middle of the burn. Fires adapt dramatically to weather fronts that may roll into the region and to normal daily changes that occur as the weather gets hotter, drier, and windier over the course of the day. Weather forecasts should be studied carefully.

The time of year for conducting a prescribed burn varies. Wooded areas usually burn best during winter since leaves are needed to carry the fire. The longer leaves are on the ground after leaf-drop, the more difficult they are to burn. It is harder to carry a fire through wooded areas during the growing season than in December or January. For burns conducted during summer and fall, grasslands and mixed shrublands burn better than woodlands. To carry a fire during the growing season, the previous year's grass and forb growth is needed. This requires planning to ensure grazing does not remove too much plant material.

After a wildfire, assessments of damage may be made based upon the type or species of tree and visual observation, but ultimately removal of these dangerous trees is essential to protect persons and property from the danger of falling trees in the wake of a large area fire. This removal can be an expensive and dangerous proposition, regardless of who is responsible for the removal of the trees. Improvements allowing tree removal to become safer, faster, and less time-consuming are highly desirable.

The responsibility for removal of dead or damaged trees following a wildfire or a prescribed burn varies. Utility companies may need to take down burned trees that threaten power lines. Alternatively, the responsibility for actually removing dead trees from a site may fall on customers. The decisions about which burned trees to remove in or near public right of ways are made multiple levels by applicable public authorities and land owners. Thousands of trees may be designated for removal across a burned region, some of which are in public right of way and some on private property. Removal needs are categorized into varying levels of urgency, including from "extreme," which pose the most risks of falling into the roadway and causing injuries.

Damaged trees may be removed from the burned region by cutting them and hauling them away, which is labor intensive, and expensive, particularly when performed by a certified arborist. Cutting and rigging equipment are necessary for climbing large trees, bringing limbs safely to the ground, as well as transporting power tools and heavy equipment up and down, to and from the operator high up in the canopy. A few of these rigging tools include blocks and pulleys, slings, friction brakes, rigging plates, carabiners, winches, power pullers, ring slings, cable hoists, swivels, rigging thimbles and rope. The cutting equipment includes hand saws, pruners, tree loppers, axes, hedge trimmers, hatchets and chainsaws. The cutting tools and the cutting process present the most danger. Safety and the proper, well-maintained climbing equipment are of utmost importance. Manual tree removal is inefficient and hazardous, particularly over a large burn area covering hundreds or thousands of acres.

A skid-steer loader, or skid steer, is generally used in the construction, ranching, and farming industries because it is smaller more maneuverable, and costs less to operate than larger equipment with similar capabilities. A skid steer is a rigid frame, engine powered machine with lift arms attached to a standardized multi-purpose attachment. Attached to the lift arms may be a wide variety of tools, powered by a hydraulic system or other suitable means. Saw attachments for skid steers cut trees off above the ground, leaving root systems that will prevent new growth, potentially for years. To remove the root system of the tree, after sawing it off, requires an additional attachment like a stump grinder or a bucket for digging out the roots. Operating with a tool that digs into the ground presents a higher risk of damage to the soil. When grappling trees with a grapple bucket, the limbs would frequently break the vehicle windows, creating possible harm to operator and equipment, and incurring costs to replace the window Options for removing trees with a skid steer, or with a tractor or truck, that avoid damaging the ground include wrapping a chain around trees and lifting the tree and root system out of the ground. This operation requires a second operator or requires that the operator leave the cabin of the vehicle to attach a chain. Other attachments may solve this problem through the use of hydraulic jaws for the purpose of grabbing/lifting trees. This requires the use of a hydraulic connection as well as at least one hydraulic cylinder and plurality of life-limited moving parts and associated maintenance. It would also likely prevent the use of any other hydraulic attachment that might be used simultaneously with the equipment. All of these options add significant man hours to the prospect of tree removal, and some of these options require the attention of a second person. Additionally, operators at a higher risk of bodily harm by requiring that they manipulate heavy equipment outside of the safety of the cabin of the vehicle.

A tree harvester is a large industrial machine employed in logging operations for felling, delimbing and bucking trees. A tree harvester is typically employed together with a forwarder that hauls the logs to a roadside landing. A tree harvester leaves behind branches that must be gathered and processed into chipwood or used in boiler houses for heat and electrical production. A tree harvester is adapted for ingathering live wood and does not enable the safe and efficient removal of limbs or roots left embedded in the earth.

Another type of conventional tree removal machinery grasps, pulls, and lifts the tree from the soil and transports it for disposal. The machine grasps between jaws a tree that is to be removed and uproots the tree in a vertical motion with a lifting force. Only one tree may be removed at a time, which is very inefficient for clearing large swaths of burned acreage.

A grubber comprises a combination rake and grubber implement mounted on a work vehicle, such as a tractor or bulldozer. The grubber has a rake that can gather rocks, debris, and severed roots to the surface for simultaneous raking along with undesirable surface rocks, debris, and vegetation. During operation, the vehicle operator may independently control the ground rake and grubber positions with respect to each other and with respect to the ground without having to dismount. This device is particularly adapted for raking the ground and bringing buried rocks and severed roots to the surface and raking them forward. However, it is not adapted for tree removal, particularly for clearing thousands of acres of burned trees. Moreover, the grubber disturbs the ground at a deep level which may be unsuitable for certain applications.

Yet another conventional tree removal device comprises a bulldozer tractor attachment that uproots and piles trees and removes stumps. The bulldozer moves on belts, and the attachment pushes dead trees in a manner similar to a bulldozer plow. The plow is fitted with a series of parallel, vertical, arched earth-engaging members welded to the plow, which dig into the ground and dislodge rocks and roots. A board protects the radiator of the tractor from damage inflicted by dead trees which have been dislodged. This device lacks the efficiency for clearing a large number of trees, particularly larger trees, from a large burned area. The earth-engaging members accumulate earth and can damage the earth, which may be unsuitable for pasture and croplands.

The tree and debris pusher, also referred to herein as a pusher, of the present invention provides a vehicle, or a removable attachment for a vehicle such as skid steers, tractors, dozers and trucks, for safely eradicating trees, shrubs, brush, stumps and other debris that may be rooted in the ground or resting on the ground, by removing them from below the ground level while disturbing the soil as little as possible. The pusher of the present invention further comprises a tree removal device having no moving parts, thus mitigating maintenance problems, and requiring minimal additional input from operators, whether from inside or outside of the cabin, during tree removal operations. The pusher of the present invention allows the simultaneous use of other attachments in furtherance of the goal of enabling a single user to carry out tree removal operations without having to leave the cabin or stop work to attach additional needed or useful attachments.

The pusher of the present invention comprises an angled pusher bar having transverse wings and a tooth assembly, which may be angled upwardly from a surface upon which the pusher rests, enabling trees to be pushed out of the soil instead of felled with a saw and eliminating the need for a saw and grapple bucket. The pusher bar angle and degree of tilt are effective for pushing and uprooting trees without cutting them. The pusher of the present invention also creates a sufficient distance from the vehicle, which minimizes the frequency of broken windows to the vehicle and harm to the operator. The respective angles of the components of the pusher of the present invention provide high performance.

The pusher of the present invention comprises an attachment for a skid steer, tractor, truck, dozer, or other vehicle. Alternatively, the pusher of the present invention comprises a vehicle including the pusher. The pusher of the present invention protects the operator from debris and allows the operator to remain safely in the tractor cab while removing trees and brush or otherwise clearing land of debris. The invention is useful for clearing brush, shrubs and trees of various kinds, including dead cedar trees, and for piling cut, fallen, or dead trees and other debris. After wild fires or other natural disasters, pastures and land may be littered with dead trees. The pusher of the present invention can be used in place of a grapple bucket or other devices that push cut trees into a pile.

The pusher of the present invention is also more efficient that conventional devices and requires less maintenance, thus saving time and money. Using only one attachment, the pusher causes less wear and tear on equipment, causes less damage to soil, and eradicates trees in a safe and effective way. The design of the present invention was carefully created and crafted after years of eradicating trees with saws and grapple buckets. The pusher works faster and more efficiently with less equipment maintenance, eliminates tree stumps on the land without damaging the soil, and is suitable for clearing thousands of acres of land of burned trees, brush, shrubs and other debris.

The pusher of the present invention eliminates the necessity of switching attachments, thus saving time and money. Trees can be pushed out of the soil, instead of felled and then switching attachments from a tree saw to grapple bucket to stack and pile cut trees. After the trees are pushed out of the soil, the pusher of the present invention pushes the debris together in one pile for disposal or burning. The pusher of the present saves time, increases productivity, reduces fuel costs, reduces work time, saves wear and tear on equipment and tires, reduces the frequency of oil changes, and provides numerous other benefits.

Figure 1:
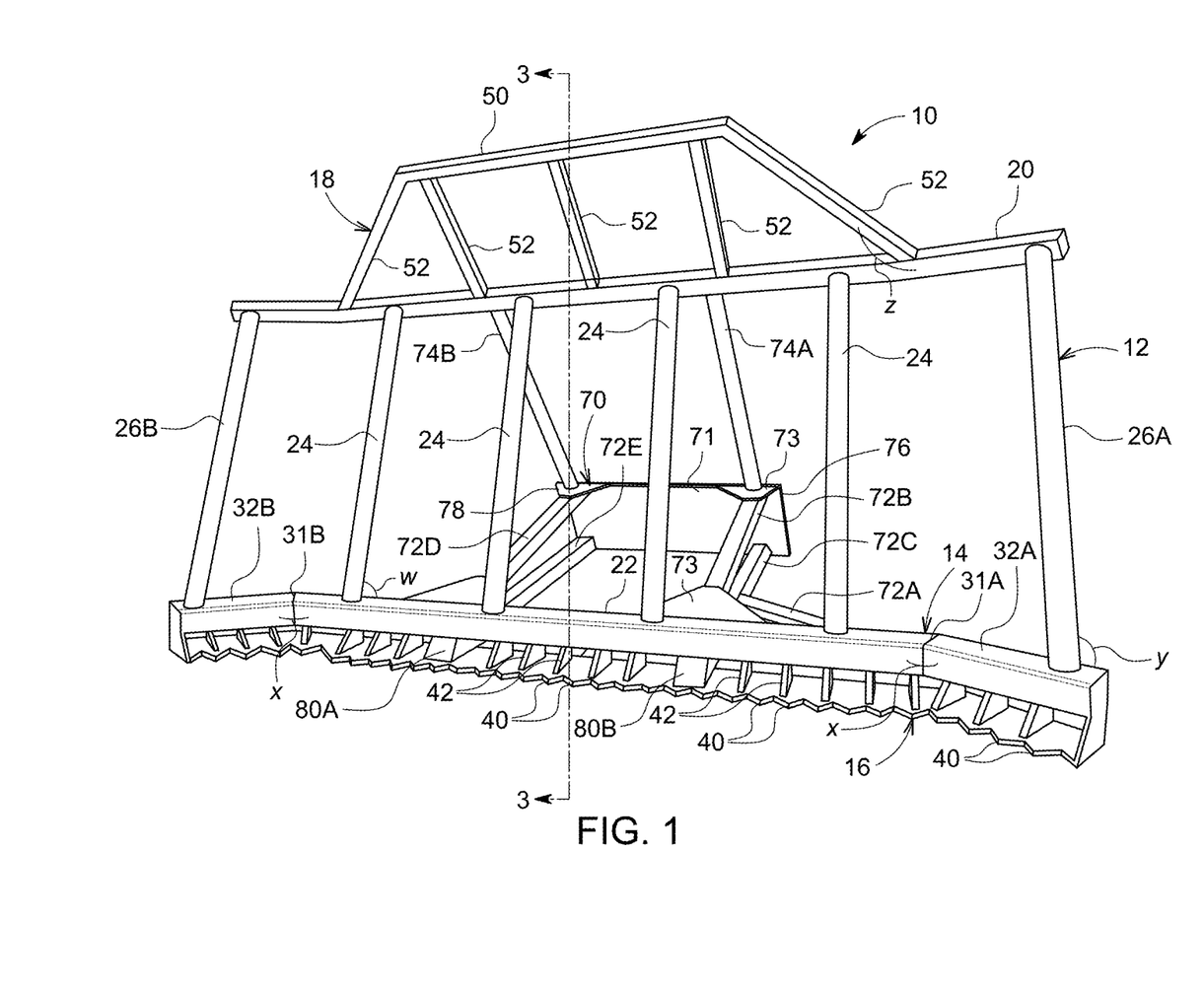
FIG. 1 a front perspective view of an exemplary tree and debris pusher constructed in accordance with the present invention.
Figure 2:
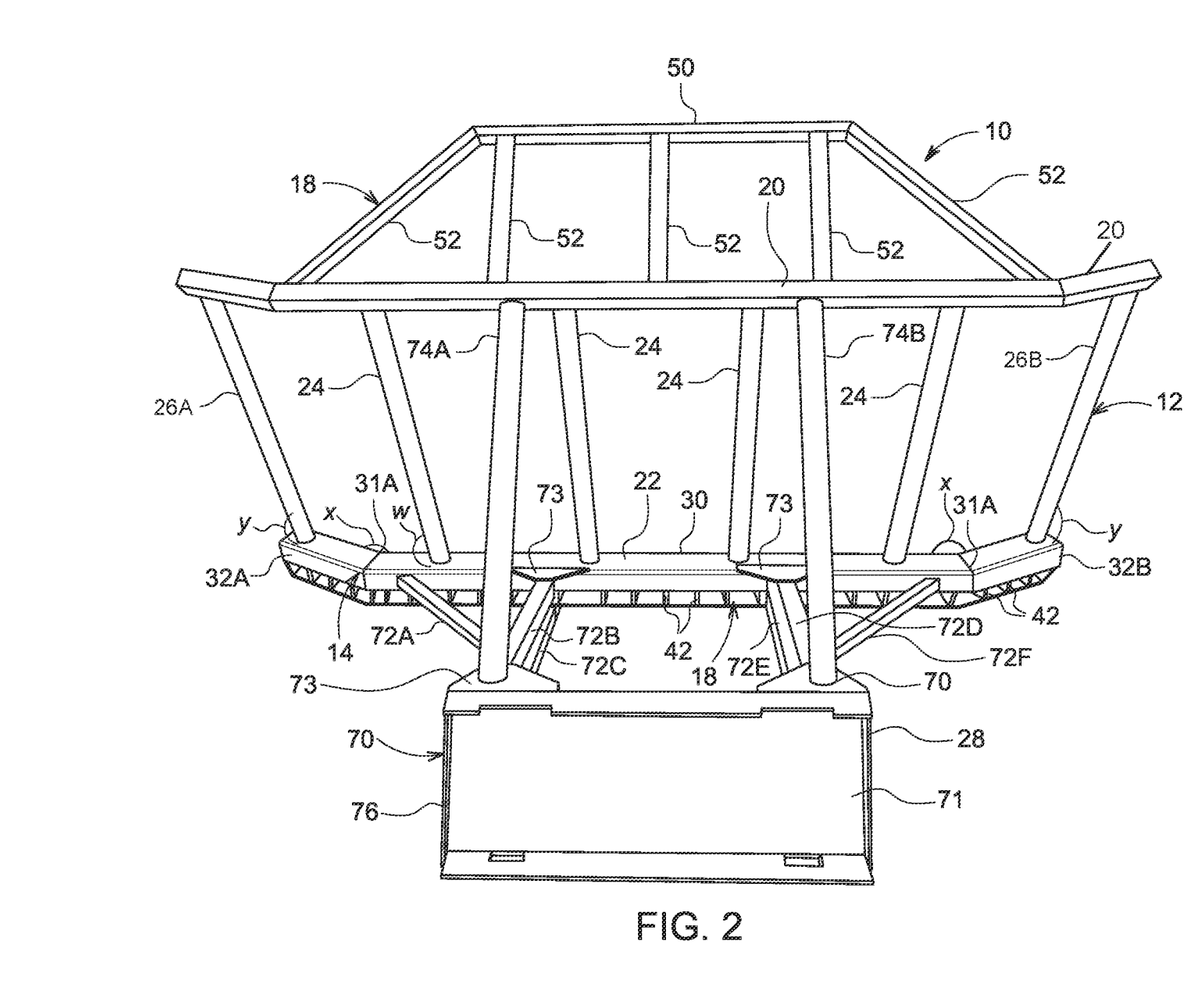
FIG. 2 is a rear view of an exemplary tree and debris pusher constructed in accordance with the present invention.

Turning now to the drawings in general, and to FIGS. 1 and 2 in particular, there is shown therein an exemplary pusher 10 constructed in accordance with the present invention. The pusher 10 comprises a frame 12, a pusher bar assembly 14, a tooth assembly 16, and a limb guard 18. The pusher 10 may be made be of any material suitable possessing sufficient strength properties to push heavy objects, including, without limitation, steel, chrome, steel chrome-plated, steel with nickel/silicon carbide composite coating, brass, brass-chrome plated, brass with nickel/silicon carbide composite, stainless steel, stainless chrome-plated, copper, stainless with nickel/silicon carbide composite coating, carbonitrided steel, nickel carbide plated steel, tempered steel, glass fiber composites, carbon fiber composites and combinations of the foregoing. It will be appreciated that the pusher 10 may be produced from other materials possessing suitable strength for the application and that are suited to the particular temperatures, pressures, fluids, and other conditions of use. It further will be appreciated that the pusher 10 may be comprised of a plurality of materials. By way of example, the frame 12 of the pusher 10 may be comprised of a single material, while the pusher bar assembly 14 may be comprised of another material or combination or materials particularly suited thereto.

The dimensions of the pusher 10 are variable. The depth of the pusher 10 generally ranges from at least about 5 feet to at least about 50 feet. The width of the pusher ranges from about 3 feet to about 60 feet. The height of the pusher 10 generally ranges from about 5 feet to about 50 feet. In one embodiment of the invention, the width of the tree pusher 10 ranges from about 3 feet to about 8 feet, and the height of the tree pusher generally ranges from about 1 foot to about 4 feet. References herein are to outside diameters, unless specifically stated to reference an inner diameter. It will be appreciated, however, that the pusher 12 may be any height, width and length suited for conditions for the application and at the site where in use. The pusher 10 preferably, though not necessarily, complies with the American National Standards Institute (ANSI) quality standards and dimensions.

The frame 12 of the pusher 10 may be any shape. In one embodiment of the invention the frame 12 is generally rectangular in shape and angles rearward toward an operator of the pusher 10 in a manner and for a purpose yet to be described.

The frame 12 of the pusher 10 comprises a top surface or top member 20, a bottom surface or bottom member 22, and a plurality of support members 24 interposed therebetween. The plurality of support members 24 provide strength to the frame 12 and help resist loads on the pusher 10. In one embodiment of the pusher 10, the frame 12 comprises a top member 20 which is horizontally parallel to the bottom member 22. The top member 20 and the bottom member 22 may be positioned on the frame 12 in separate vertical planes, although it will be appreciated that the horizontal top member and the bottom member may be in the same vertical plane. Positioning the top member 20 and the bottom member 22 in separate vertical planes provides a number of advantages, including creating a sufficiently safe distance between the operator of the pusher 10 and the trees and debris being removed. Other advantages realized by positioning the top member 20 and the bottom member 22 in separate vertical planes include enabling the pusher to act like a scoop and, therefore, more to efficiently and effectively hold and remove more trees and debris.

Figure 3:
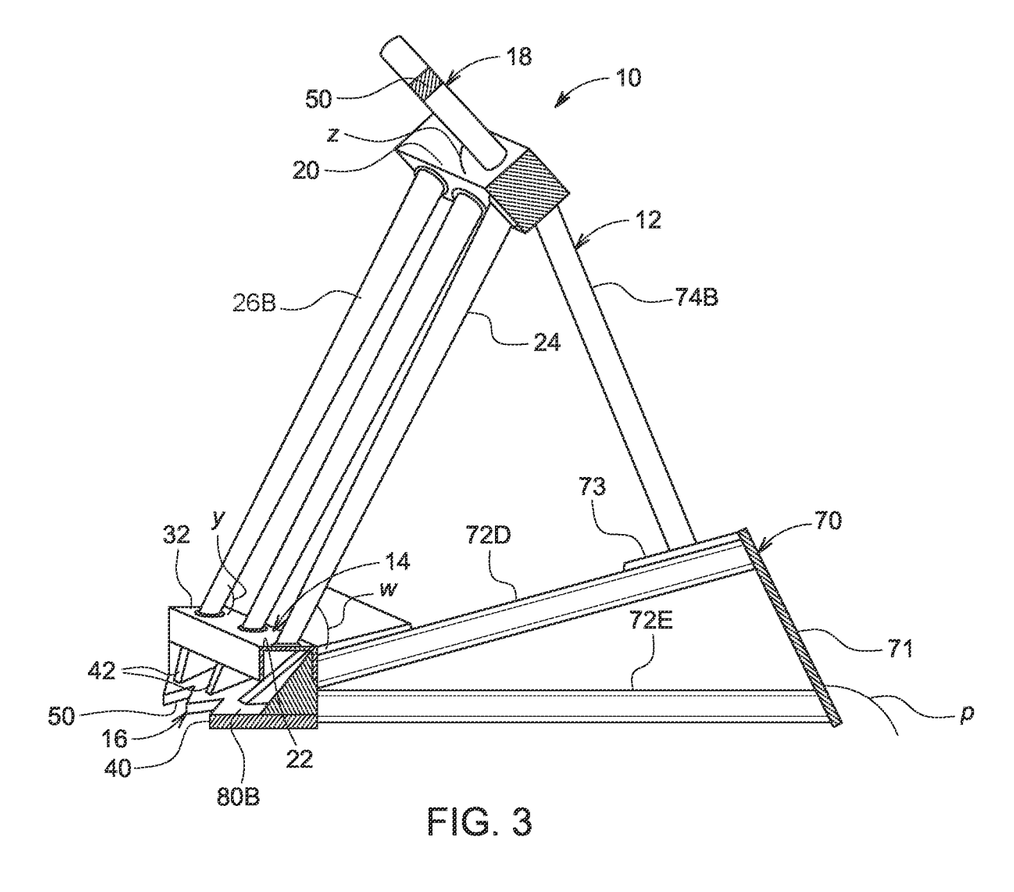
FIG. 3 is a cross section of the tree and debris pusher of FIG. 1, taken along line 3-3 of FIG. 1.

Such a configuration of the top member 20 and the bottom member 22 necessitates that the plurality of support members 24 will be interposed therebetween at an angle w with respect to the bottom member 22 or the pusher bar assembly 14, as shown in FIG. 3. The angle w of the plurality of support members 24 generally ranges from about 65 degrees to 85 degrees with respect to the bottom member 22 or the pusher bar assembly 14, as shown in FIG. 3. In one embodiment of the invention, the angle w of the plurality of support members 24 is 89 degrees, while in another embodiment of the invention, the angle w is 82 degrees.

The number of support members 24 varies with the dimensions of the frame 12 of the pusher 10. As a general rule, the larger the frame 12, the greater the number of support members 24 are needed to impart strength and resist loads. In one embodiment of the invention, the pusher 10 comprises a plurality of four support members 24. It will be appreciated that the plurality of support members 24 may be any shape, including circular or square in cross section. In one embodiment of the invention, the plurality of support members 24 are columnar and have a circular cross section ranging between about 3 inches to about 6 inches and a wall thickness from about 0.25 inches to about 0.375 inches. The length of the plurality of support members 24 ranges from about 2 feet to about 10 feet and their width ranges from about 1 inch to about 10 inches. In one embodiment of the invention, the plurality of support members 24 are about four feet in length and 3 inches in width or diameter.

The pusher bar assembly 14 is positioned adjacent the bottom member 22 of the frame 12. In one embodiment of the invention, the bottom member 22 comprises a top surface of the pusher bar assembly 14. The pusher bar assembly 14 traverses the width of the frame 12 and, in one embodiment of the invention, the width of the pusher bar assembly may be greater than the width of the frame. The width of the pusher bar assembly 14 ranges from about three feet to about 100 feet. The depth of the pusher bar assembly 14 ranges from about 4 inches to about 3 feet, and the height of the pusher assembly ranges from about 4 inches to about 2 feet. In one embodiment of the invention, the pusher bar assembly has a width of 12 feet, a height of 7 inches and a depth of one foot.

Figure 4A:
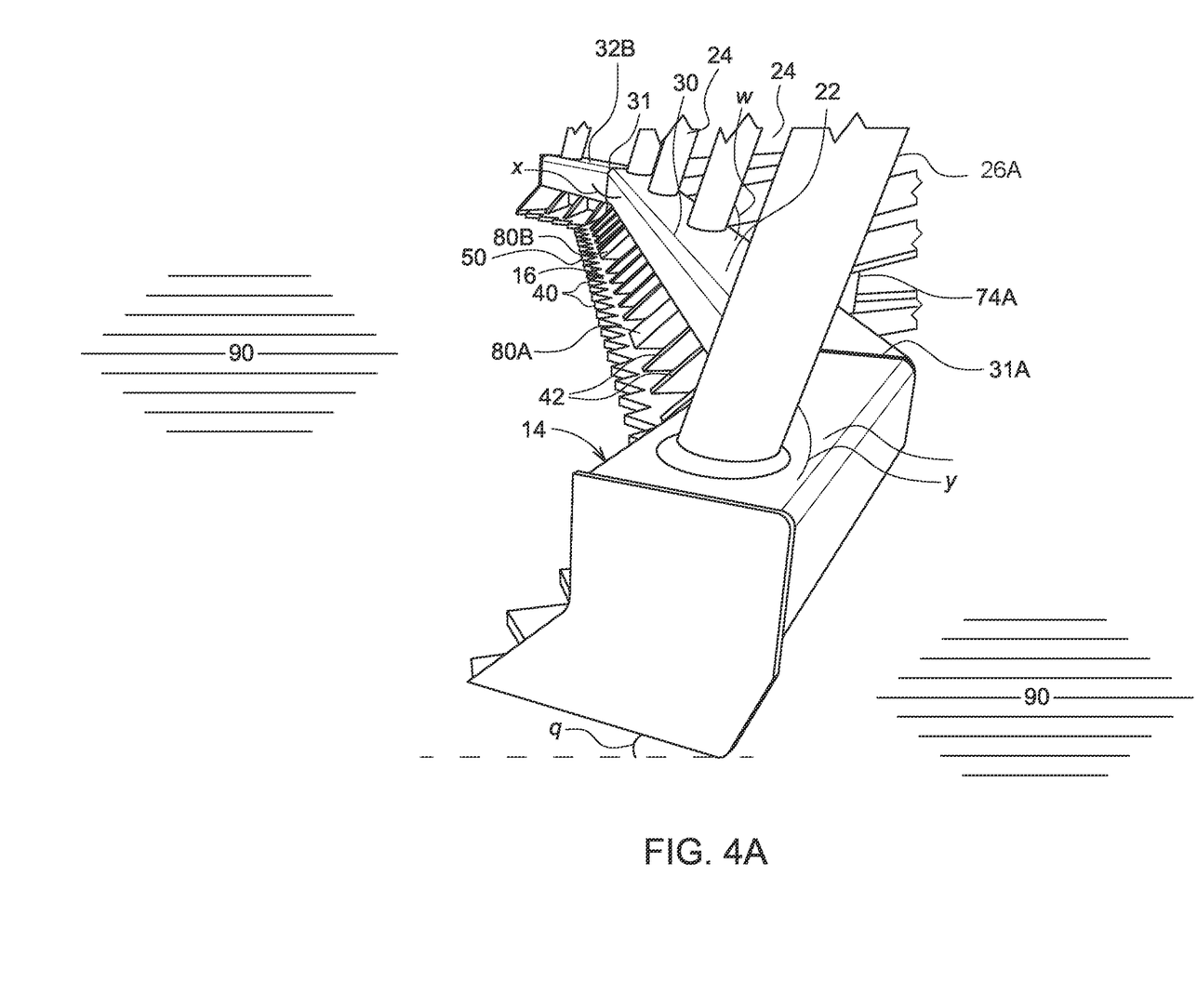
FIG. 4A is side view of an exemplary pusher bar and tooth assembly of the tree and debris pusher of the present invention.
Figure 4B:
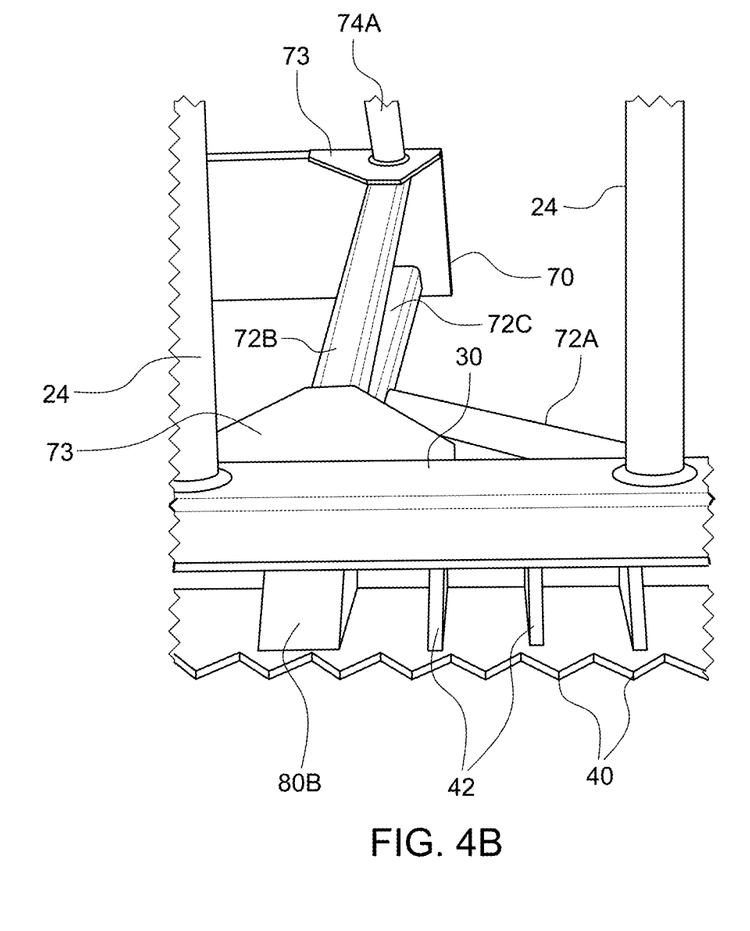
FIG. 4B is partial frontal view of the center section of an exemplary pusher bar and tooth assembly of the tree and debris pusher of the present invention.
Figure 4C:
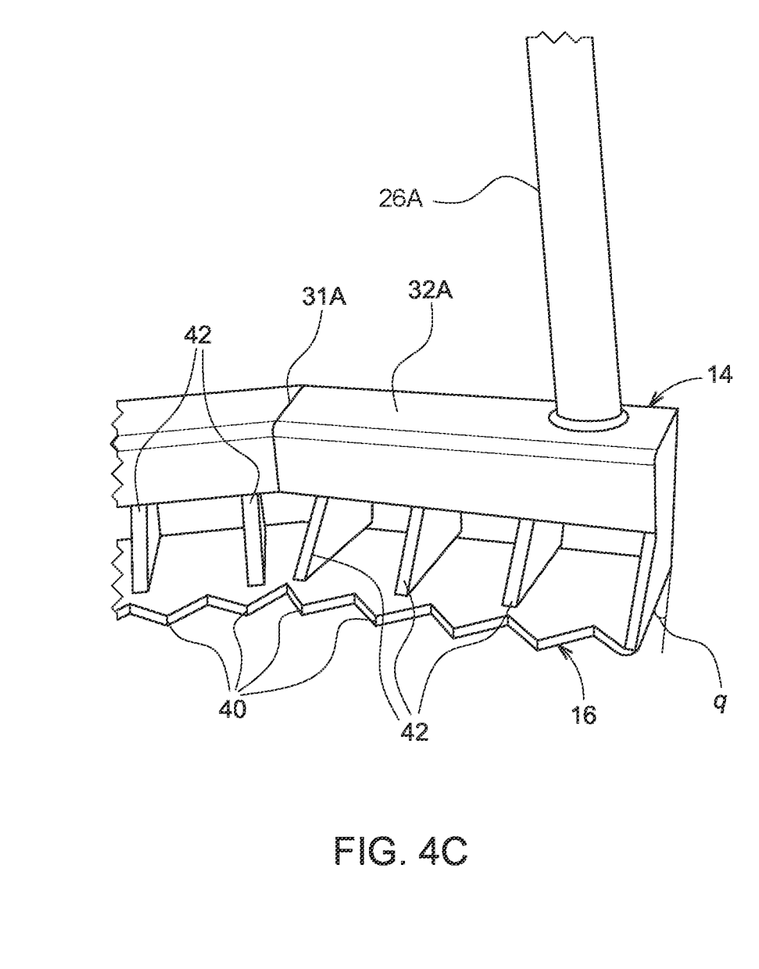
FIG. 4C is a frontal view of an exemplary transverse wing and tooth assembly of the pusher bar of the tree and debris pusher of the present invention, showing the transverse wing adjoining the central section of the pusher bar.

Turning now to FIGS. 4A, 4B and 4C, but with continuing reference to FIGS. 1, 2 and 3, the pusher bar assembly 14 further comprises a central section 30 and wings 32A and 32B attached at opposite first and second ends of the central section. The wings 32A and 32B may be the same length as the central section 30. Alternatively, the wings 32A and 32B may be shorter or longer in length than the central section 30 of the pusher bar assembly 14. In one embodiment of the invention, the wings 32A and 32B have a length that is less than the length of the central section 30 of the pusher bar assembly 14. The wings 32A and 32B range in length from about 2 feet to about 4.5 feet, and in one embodiment of the invention, the wings are 2 feet in length. It will be appreciated that the pusher bar assembly 14 may be any shape adapted to remove, gather and push trees and debris to a selected location.

The length of the central section 30 with respect to the length of the wings 32A and 32B of the pusher bar assembly 14 comprises a ratio of about 10:1 to about 10:3. In one embodiment of the invention, the ratio of the length of the central section 30 to the length of the wings 32A and 32B is 10:2.

The wings 32A and 32B traverse the pusher bar assembly 14 at opposite ends 31A and 31B of the central section 30 and are positioned in the same horizontal plane as the central section 30. The wings 32A and 32B may be attached at an angle x with respect to the central section 30, which imparts a generally concave or arcuate shape to the pusher bar assembly 14, which also facilitates gathering and scooping of trees, shrubs and debris. In one embodiment of the invention, the angle x is an obtuse angle that ranges from about 91 degrees to about 179 degrees. In another embodiment of the invention, the angle x ranges from about 115 degrees to about 175 degrees, while in another embodiment, the angle x is 125 degrees to about 165 degrees. In another embodiment of the invention, the angle x is 155 degrees. In yet another embodiment of the invention, the pusher bar assembly 14 forms a generally arcuate shape without forming angles.

It now will be appreciated that the frame 12 is generally rectangular in shape and that two outer support members 26A and 26B extend from the upper surface or upper support member 20 of the frame 12 toward the wings 32A and 32B in a manner that is unparallel with the plurality of support members 24. Due to the unparallel configuration, the angle y of the outer support members 26A and 26B with respect to the bottom member 22 or the pusher bar assembly 14 may differ from the angle w formed by the plurality of support members 24. In one embodiment of the invention, angle y of the outer support members 26A and 26B generally ranges from about 65 degrees to about 85 degrees with respect to the pusher bar assembly 14. In one embodiment of the invention, the angle y of the outer support members 26A and 26B is 82 degrees.

The outer support member 26A and 26B may be the same shape and size as the plurality of support members 24 or they may differ in shape and size to provide additional strength at the edges of the frame. The diameter or dimensions of the plurality of outer support members 26A and 26B range from about 2.5 inches to about 3.5 inches and in one embodiment of the invention, the support members 26A and 26B are have the same dimensions and the plurality of support members 24 and angles w and y are approximately equal.

With continuing reference to FIGS. 4A, 4B and 4C, the tooth assembly 16 is contiguous with the pusher bar assembly 14 and comprises a plurality of teeth 40 extruding therefrom so as to precede the pusher bar assembly in the direction of use and make first contact with the trees, shrubs and other debris which are the object of removal. In one embodiment of the invention, the tooth assembly 16 is co-extensive with the pusher bar assembly 14 along its width, including the central section 30 and wings 32A and 32B of the pusher bar assembly. A plurality of connecting members 42 connect a bottom surface 36 of the pusher bar assembly 14 with the tooth assembly 16, providing additional support, compressive strength and rigidity. The connecting members 42 are spaced equidistantly along the length of the pusher bar assembly 14 at a distance of about 3 inches to about 6 inches apart, while in yet another embodiment of the invention, the connecting member 42 are spaced equidistantly approximately 5 inches apart.

The teeth 40 comprising the tooth assembly 16 may be any shape adapted to catch or snag trees or debris and impart force to the object to be removed. In one embodiment of the invention, the teeth 40 are saw-like in shape, forming an angle of about eighty (80) to one hundred (100) degrees between the point of each tooth, and are positioned continuously, without gaps therebetween, along the entire length of the pusher bar assembly 14. The number of teeth 40 comprising the tooth assembly 16 and the number of connecting members 42 depend upon of the width of the pusher bar assembly. In one embodiment of the invention, the tooth assembly 16 comprises a total of 36 teeth 40, with each tooth measuring 5.5 inches wide, wherein the central section 30 comprises twenty-six (26) teeth 40 and the wings 32A and 32 B each comprise five (5) teeth 40. The number and size of teeth 40 and the shape of the teeth could be modified without departing from the spirit of the invention.

Turning now to FIG. 4A, it will now be appreciated that the tooth assembly 16 may angle upwardly from a substrate 90 upon which the pusher 10 is situated. The upwardly angled configuration of the tooth assembly 16 enhances the functionality of the pusher 10 when uprooting, gathering and pushing trees, shrubs and debris. In one embodiment of the invention, the tooth assembly 16 angles upward from the substrate 90 at an angle q that ranges from about 1 degree to about 15 degrees. In another embodiment of the invention, the tooth assembly 16 angles upward from the substrate 90 at an angle of about 7 degrees. It also will be appreciated that both the pusher bar assembly 14, and the tooth assembly 16 contiguous therewith, may angle upwardly at an angle q with respect to the substrate 90.

The teeth 40 of the tooth assembly 16 may be coated with a composition to protect against degradation due to moisture, salt spray, oxidation or exposure to a variety of environmental or industrial chemicals used in fire-fighting or other applications. Coatings provide added protection of metal surfaces and act as a barrier to inhibit the contact between chemical compounds or corrosive materials in the environment, offer abrasion resistance, non-stick performance and chemical protection. Coatings suitable for use in the present invention include fluoropolymers, epoxies, polytetrafluoroethylene (PTFE), ceramic epoxy coatings, phenolic compounds, zinc compounds, phosphates and molybdenum disulfide.

In one embodiment of the invention, the teeth 40 are formed from a single piece of material, such as sheet metal, with the teeth 40 being shaped by a cutting means, such as an acetylene torch or plasma cutter, so that the tooth assembly comprises a single, solid piece of material. Another shaping means could be used to form the teeth 40 from a solid piece of material, such as extruding, without departing from the spirit of the invention; however, such means could be more expensive than cutting the teeth 40 into the material. The present invention could also may carried out through the attachment of pre-formed teeth to a structure, although such a configuration may possibly provide less strength and rigidity.

The plurality of connecting members 42 may be any shape but in one embodiment of the invention, the connecting members form right trapezoids and are made of a sheet metal similar in thickness to that used to create the teeth 40 of the tooth assembly 16. Alternatives materials and shapes are possible for use in the construction and configuration of the connecting members 42. It will be appreciated that the tooth assembly may be attached directly to the pusher bar assembly 14 without the use of vertical members 42. However, vertical support members 42 provide space for soil and small debris to pass through the pusher and prevent the pusher bar assembly 14 and the tooth assembly 16 from becoming plugged with debris and soil. In one embodiment of the invention, the vertical support members 42 are spaces equidistantly approximately 5 inches apart.

Returning now to FIGS. 1 and 2, the limb guard 18 is positioned atop the frame 12 and extends from the top member or surface 20 thereof. In one embodiment of the invention, the limb guard 18 angles forward at an angle z from the top member or surface 20 of the frame 12 and away from the vehicle to which the pusher 10 is attached. Angle z is an obtuse angle ranging from 91 to about 179 degrees. In one embodiment of the invention, the limb guard 18 angles forward at an angle z of about 115 degrees to about 155 degrees. In one embodiment of the invention, the limb guard 18 angles forward with respect to the top member or surface 20 of the frame 12 and away from the vehicle to which the tree pusher 10 is attached at an angle z of 135 degrees. The limb guard 18 angles forward so as to block trees, limbs and other debris from reaching the vehicle or the operator of the pusher 10. The limb guard 18 may be any shape adapted to block trees, limbs and other debris. The limb guard 18 ranges in length from about twelve feet to about two feet, and in height from about one foot feet to about four feet, and in depth from about one inch to about 12 inches. In one embodiment of the invention, the limb guard 18 is four feet in length, 1.625 feet in height and two inches in depth.

The limb guard 18 may be solid or may comprise a plurality of interconnected support structures 52. In one embodiment of the invention, the limb guard is substantially trapezoidal in shape, wherein the top surface or member 20 of the frame 12 forms the bottom surface or member of the limb guard 18 and the top surface or member 50 of the limb guard is shorter in length than the length of the top surface or member 20 of the frame 12. In one embodiment of the invention, the limb guard 18 is comprised of pieces of metal bars comprising support structures 52 joined to the top member or surface 20 of the frame 12. It will be appreciated that the limb guard 18 may comprise other shapes and configurations consistent with the spirit of the invention.

Figure 5:
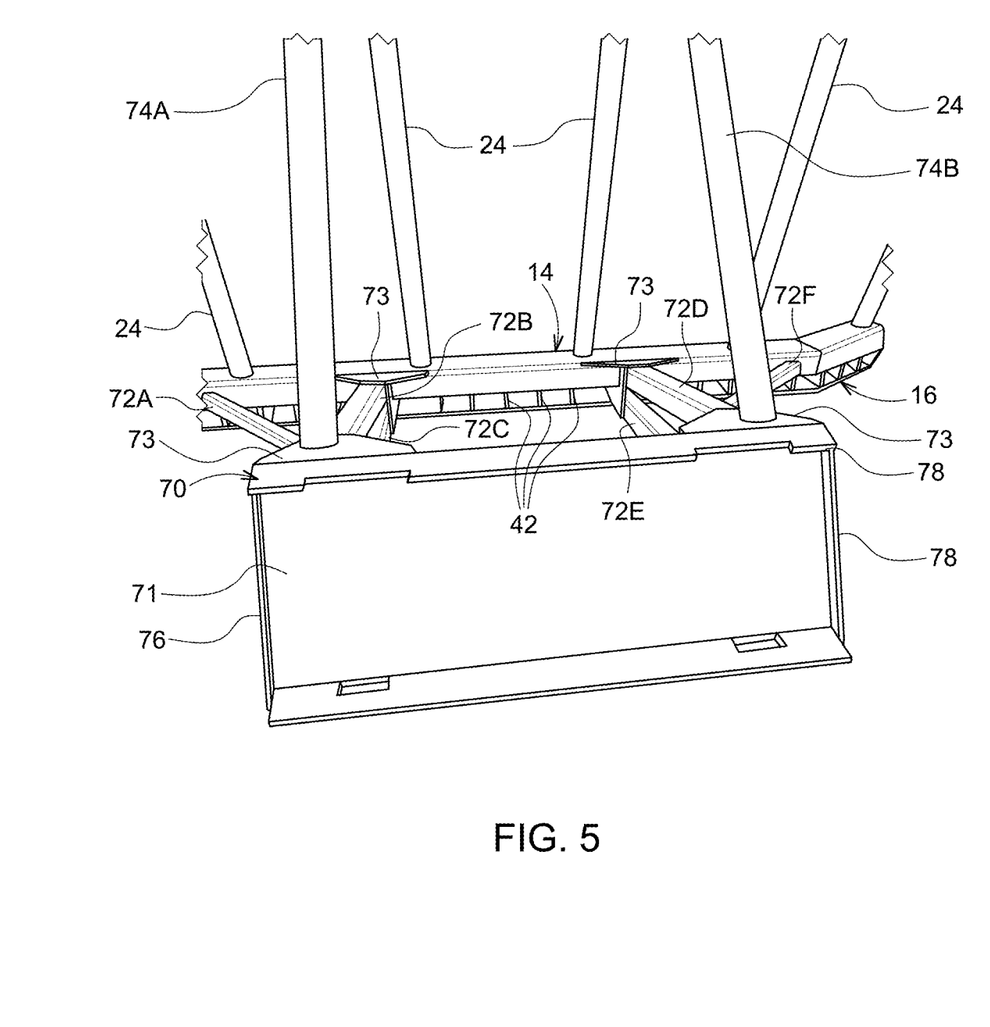
FIG. 5 is a view of an exemplary attachment assembly of the tree and debris pusher of the present invention.

Turning now to FIG. 5, the pusher 10 may further comprise an attachment assembly 70 adapted to releasably attach the pusher to a vehicle. The attachment assembly 70 comprises vehicle attachment plate 71 which, in one embodiment of the invention, is connected with the pusher bar assembly 14 and the tooth assembly 16 via attachment support members 72A, 72B, 72C, 72D, 72E, and 72F. Attachment support members 72A, 72B, 72C, 72D, 72E, and 72F extend from the four corners of the vehicle attachment plate 71, four of which are upper support members and two of which are lower support members. The two upper attachment support members 72A and 72F may differ in length from the two lower attachment support members 72C and 72E, and the two upper attachment support members 72B and 72D, and the two upper attachment support members 72B and 72D may differ in length from the two lower attachment support members 72C and 72E. To that end, it will be appreciated that the attachment assembly 70, including vehicle attachment plate 71, are configured angularly with respect to the pusher 10 and the substrate 90 upon which the pusher is used or rests. In one embodiment of the invention, the attachment assembly 70 and vehicle attachment plate 71 are configured with respect to the substrate 90 at an angle p ranging from about 100 degrees to about 120 degrees. In another embodiment of the invention, the attachment assembly 70 and vehicle attachment plate 71 are configured with respect to the substrate 90 at an angle p of about 110 degrees.

The two upper attachment support members 72B and 72D and the two lower attachment support members 72C and 72E on each of the transverse ends 76 and 78 of the vehicle attachment plate 71 may extend generally forward from the pusher bar assembly 14 so as to provide space therebetween the cabin of the vehicle to which the pusher 10 is attached or of which the pusher forms a part. The two upper attachment support members 72A and 72F extend angularly from the transverse ends 76 and 78 of the vehicle attachment plate 71, or from the two upper attachment support members 72B and 72D, toward the pusher bar assembly 16 to provide additional support and strength to the pusher 10. The attachment support members 72A, 72B, 72C, 72D, 72E, and 72F may further comprise diverging ends 73 at the point of connection with the attachment assembly 70 and/or the tooth assembly 16 to provide addition strength and support.

Returning to FIG. 1, the upper attachment support members 72B and 72D and the lower attachment support members 72C and 72E also may converge at points of connection with the pusher bar assembly 14 and the tooth assembly 16 at joints 80A and 80B, imparting additional connective support and strength to the pusher 10. To that end, the two upper attachment support members 72 B and 72 D may angle downward and toward the pusher bar assembly 14 and tooth assembly 16 and converge at joints 80A and 80B with the generally two lower attachment support members 72C and 72E. The joints 80A and 80B generally parallel the plurality of support members 42. The shape of the joints 80A and 80B is substantially similar to the right-trapezoidal shape of the plurality of support members 42. Other possible shapes exist for the joints 80A and 80B.

The dimensions of the attachment support members 72A, 72B, 72C, 72D, 72E, and 72F will vary with the dimensions of the pusher 10. In one embodiment of the invention, the attachment support members 72A, 72B, 72C, 72D, 72E, and 72F each measure from about three to about six feet in length, about 2.5 to about 3.5 inches in width and about 1 to about 1.5 feet in diameter. In one embodiment of the invention, attachment support members 72A, 72B, 72C, 72D, 72E, and 72F each measure 4 feet long and 3 inches in diameter. It will be appreciated that the number of attachment support members may be greater than or less than six, depending upon the size of the pusher 10.

A plurality of rear support bars 74 provide additional support, strength and rigidity between pusher 10 and the vehicle to which it is attached. In one embodiment of the invention, two rear support members 74A and 74B extend from the top surface or member 20 of the frame 12 to the attachment assembly 70. In one embodiment of the invention, the rear support members 74A and 74B each measure from about 3.5 to about 4.5 feet in length, about 2.5 inches to about 3.5 inches in diameter or width, and about 3.5 to about 4.5 feet in height. It will be appreciated that the number of rear support members be greater than or less than two, depending upon the size of the pusher 10. It now will be appreciated that the frame 12 extends from the pusher bar 14 in a rearward direction, and interconnects with the rear support bars 74A and 74B, forming an angle of less than 90 degrees therewith, providing additional support to the overall structure of the pusher 10.

In one embodiment of the invention, the frame 12, the pusher bar 14, the tooth assembly 16, the limb guard 18, and the attachment assembly 70 constitute one integral or unitary structure, without moving parts. For example, the pusher may be made by welding metal tubing and sheet metal in such a structure as is intended to bear the forces placed upon objects to be removed from or on the soil and piled in a desire location. The pusher 10, having no moving parts, is well suited to this objective because of the immense pressures that will be placed upon the pusher. A plurality of options exist for utilizing various shapes of the aforementioned metal tubing and sheet metal in order to reinforce the structure and the principal that the addition of reinforcing material adds weight to the invention, therefore making it consume more energy during normal operations and adjusting other factors, in the manners that are consistent with adding weight to heavy machinery.

The method and operation of the invention will now be explained. The foregoing description of the invention is incorporated herein. A method of removing or felling a tree are provided, wherein the method comprises the step of providing a pushing surface for pushing the tree, wherein the pushing surface forms a central section having a length and first and second ends and forms a first wing proximal the first end of the central section and a second wing proximal the second end of the central section, and wherein the first wing has a length and the second wing has a length and the length of the central section with respect to the lengths of the first wing and the second wing ranges from a ratio of about 10:1 to about 10:3. The tree is pushed with the pushing surface. It will be appreciated that the pushing surface may be three dimensional in shape. The pushing surface may be placed at any point on the trunk of the tree to be removed. However, pushing against the base of the tree yields greater pushing force near the roots of the tree.

The method may further comprise the step of attaching the first wing and the second wing to the central section at angles ranging from about 91 degrees to about 179 degrees and imparting a generally concave or arcuate shape to the pushing surface.

The method step of providing a pushing surface further comprises the step of attaching the first wing and the second wing to the central section at angles ranging from about 91 degrees to about 179 degrees and imparting a generally concave or arcuate shape to the pushing surface.

The method may further comprise the step of providing a plurality of support members at an angle w with respect to the pushing surface, wherein the angle w ranges from about 65 degrees to 85 degrees with respect to the pushing surface.

The method may further comprise the step of providing outer support members at an angle y with respect to the pushing surface.

The method may further comprise the step of providing an attachment assembly for attaching the pusher to a vehicle.

The method may further comprise the step of providing attachment support members between the attachment assembly and the pushing surface.

The method may further comprising the steps of providing a frame and providing rear support members extending from the attachment assembly to the frame to which the pushing surface is connected.

The invention also encompasses a method of making a unitary tree pusher, the method comprising the step of manufacturing the tree pusher from industrial piping and sheet metal via welding or cutting.

It now will be appreciated that the present invention presents a new pusher having a unique configuration. The pusher of the present invention comprises an angled pusher bar having transverse wings and a tooth assembly, enabling trees to be pushed out of the soil instead of felled with a saw, which eliminates the need for a saw and grapple bucket. The pusher bar angle and degree of tilt are effective for pushing and uprooting trees without cutting them. The pusher of the present invention also creates a sufficient distance from the vehicle, which minimizes the frequency of broken windows to the vehicle and harm to the operator. The respective angles of the components of the pusher of the present invention provide high performance. The pusher of the present invention provides a vehicle, or a removable attachment for a vehicle such as skid steers, tractors and trucks, for safely eradicating trees, shrubs, brush, stumps and other debris that may be rooted in the ground, by removing them from below the ground level while disturbing the soil as little as possible. The pusher of the present invention further comprises a tree removal device having no moving parts, thus mitigating maintenance problems, and requiring minimal additional input from operators, whether from inside or outside of the cabin, during tree removal operations. The pusher of the present invention allows the simultaneous use of other attachments in furtherance of the goal of enabling a single user to carry out tree removal operations without having to leave the cabin or stop work to attach additional needed or useful attachments.

The invention has been described above both generically and with regard to specific embodiments. Although the invention has been set forth in what has been believed to be preferred embodiments, a wide variety of alternatives known to those of skill in the art can be selected with a generic disclosure. Changes may be made in the combination and arrangement of the various parts, elements, steps and procedures described herein without departing from the spirit and scope of the invention as defined in the following claims.

I claim:

1. A tree and debris pusher comprising:
    a frame;
    a pusher bar assembly in communication with the frame, the pusher bar assembly comprising:
        a central section having a length and first and second ends; and
        a first wing proximal the first end of the central section and a second wing proximal the second end of the central section;
        wherein the first wing has a length and the second wing has a length and the length of the central section with respect to the lengths of the first wing and the second wing ranges from a ratio of about 10:1 to about 10:3; and
        wherein the first wing and the second wing are attached to the central section at angles ranging from about 91 degrees to about 179 degrees and imparting a generally concave or arcuate shape to the pusher bar assembly and wherein the pusher bar assembly angles upward from a substrate at an angle g that ranges from 1 degree to about 20 degrees with respect to the substrate; and
    a tooth assembly contiguous with the pusher bar assembly and comprising a plurality of teeth extruding from therefrom so as to precede the pusher bar assembly in the direction of use of the tree and debris pusher and make first contact with trees and debris which are the object of removal.

2. The tree and debris pusher of claim 1 wherein the frame further comprises a top member and a plurality of support members interposed between the top member and the pusher bar assembly at an angle w with respect to the pusher bar assembly, wherein the angle w ranges from about 65 degrees to 85 degrees with respect to the pusher bar assembly, wherein the plurality of support members impart strength and resist loads during operation of the tree and debris pusher.

3. The tree and debris pusher of claim 2 wherein the top member of the frame and the pusher bar assembly are positioned in separate vertical planes.

4. The tree and debris pusher of claim 2 wherein the frame further comprises two opposite vertical sides and two outer support members and wherein the two outer support members each are positioned on one of the opposite vertical sides of the frame, wherein the two outer support members are interposed between the top member and the pusher bar assembly at an angle y with respect to the pusher bar assembly, wherein the angle y ranges from about 65 degrees to 85 degrees with respect to the pusher bar assembly and is equal to the angle w.

5. The tree and debris pusher of claim 1 wherein the tooth assembly comprises a plurality of teeth and extends beneath the pusher bar assembly and wherein the tooth assembly is horizontally parallel to the central section, the first wing and the second wing of the pusher bar assembly and is co-extensive with the pusher bar assembly along its entire length.

6. The tree and debris pusher of claim 1 further comprising a plurality of connecting members interposed between the pusher bar assembly and the tooth assembly.

7. The tree and debris pusher of claim 1 wherein the frame, the pusher bar assembly and the tooth assembly comprise a unitary structure without moving parts to enhance the strength of the tree and debris pusher.

8. The tree and debris pusher of claim 1 wherein the plurality of teeth are saw-like in shape and form angles therebetween ranging from about 80 degrees to about 100 degrees, and are positioned continuously, without gaps therebetween, contiguous with the entire length of the pusher bar assembly.

9. The tree and debris pusher of claim 1 further comprising a limb guard.

10. The tree and debris pusher of claim 9 wherein the frame further comprises a top member and wherein the limb guard is attached to the top member and extends forward at an obtuse angle z from the top member of the frame.

11. The tree and debris pusher of claim 1 further comprising an attachment assembly for attachment of the tree and debris pusher to the vehicle.

12. The tree and debris pusher of claim 11 further comprising at least one attachment support member interposed between the attachment assembly and the pusher bar assembly.

13. The tree and debris pusher of claim 11 wherein the frame further comprises a top member and at least one rear support member interposed between the top member of the frame and the attachment assembly.

14. The tree and debris pusher of claim 13 wherein the at least one rear support member extends from the top member of the frame in a rearward direction and interconnects therewith forming an angle of less than 90 degrees with the top member of the frame.

15. The tree and debris pusher of claim 1 wherein the tree and debris pusher is comprised of a material selected from the following: steel, chrome, steel chrome-plated, steel with nickel/silicon carbide composite coating, brass, brass-chrome plated, brass with nickel/silicon carbide composite, stainless steel, stainless chrome-plated, copper, stainless with nickel/silicon carbide composite coating, carbonitrided steel, nickel carbide plated steel, tempered steel, glass fiber composites, carbon fiber composites and combinations of the foregoing.

16. The tree and debris pusher of claim 1 wherein the tree and debris pusher, or a component thereof, is coated with a material selected from the following: fluoropolymers, epoxies, polytetrafluoroethylene (PTFE), ceramic epoxy coatings, phenolic compounds, zinc compounds, phosphates and molybdenum disulfide.

17. The tree and debris pusher of claim 1 further comprising an attachment assembly comprising a vehicle attachment plate connected with the pusher bar assembly and the tooth assembly, wherein that attachment assembly is configured angularly with respect to a substrate upon which the tree and debris pusher sits at an angle p ranging from about 100 degrees to about 120 degrees.

* * * * *